(12) United States Patent
Kamphuis et al.

(10) Patent No.: US 6,833,988 B2
(45) Date of Patent: Dec. 21, 2004

(54) OPEN ACCESS MONITOR STAND WITH MULTIPLE APR MOUNTING LOCATIONS

(75) Inventors: Kevin L. Kamphuis, Round Rock, TX (US); Ronald J. LeBert, II, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 49 days.

(21) Appl. No.: 10/212,332

(22) Filed: Aug. 5, 2002

(65) Prior Publication Data

US 2004/0061996 A1 Apr. 1, 2004

(51) Int. Cl.[7] .................................................. G06F 1/16
(52) U.S. Cl. ....................... 361/681; 361/683; 248/424; 248/917; D14/376; D14/451; D06/396
(58) Field of Search ........................ 361/341, 680–686, 361/879; 248/917–924, 146, 156, 480, 424; D6/396, 397; D14/100, 114, 102

(56) References Cited

U.S. PATENT DOCUMENTS

| | | | | |
|---|---|---|---|---|
| 4,931,978 A | * | 6/1990 | Drake et al. | 361/680 |
| 5,009,384 A | * | 4/1991 | Gerke et al. | 361/681 |
| 5,062,609 A | * | 11/1991 | Hames et al. | 248/918 |
| 5,568,359 A | * | 10/1996 | Cavello et al. | 361/686 |
| 5,745,341 A | * | 4/1998 | Wolff et al. | 361/682 |
| 5,969,939 A | | 10/1999 | Moss et al. | |
| 5,995,085 A | * | 11/1999 | Bowen | 361/683 |
| 6,011,687 A | | 1/2000 | Gluskoter et al. | |
| 6,023,411 A | | 2/2000 | Howell et al. | |
| 6,049,454 A | * | 4/2000 | Howell et al. | 361/686 |
| 6,061,234 A | | 5/2000 | Broder et al. | |
| 6,069,790 A | | 5/2000 | Howell et al. | |
| 6,188,572 B1 | | 2/2001 | Liao et al. | |
| 6,208,508 B1 | * | 3/2001 | Ruch et al. | 361/686 |
| 6,222,728 B1 | | 4/2001 | Jaggers et al. | |
| 6,259,601 B1 | | 7/2001 | Jaggers et al. | |
| 6,282,082 B1 | * | 8/2001 | Armitage et al. | 361/681 |
| 2003/0161096 A1 | * | 8/2003 | Yin | 361/683 |

* cited by examiner

Primary Examiner—Lisa Lea-Edmonds
(74) Attorney, Agent, or Firm—Haynes and Boone, LLP

(57) ABSTRACT

A portable information handling system includes a monitor stand. The monitor stand includes a base surface with a positioning member movably located on the base surface. A docking system is removably mounted on the positioning member, and a portable computer is docked with the docking system. A support member extends from the base surface and is positioned such that a front section and side sections of the monitor stand are free from obstructions, allowing enhanced access to the portable computer and to the docking system. A cantilever support surface extends from the support member and is substantially parallel to and spaced apart from the base surface. A monitor is mounted on the cantilever support surface.

18 Claims, 10 Drawing Sheets

OPEN ACCESS MONITOR STAND WITH MULTIPLE APR MOUNTING LOCATIONS

BACKGROUND

The disclosures herein relate generally to information handling systems and more particularly to monitor stands used with such systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of is the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Desktop computers include a monitor which is usually supported on a monitor stand. The stand typically has four support legs and a space is provided under the stand for a docking station and an information handling system such as a notebook computer. Because of this arrangement, a user does not have sufficient access to the sides of the notebook computer and a docking system such as a docking station or an advanced port replicator (APR), especially during the docking process. For example, a user is not able to dock a notebook computer with peripherals attached to the sides of the notebook computer, because the front legs interfere during the docking process. Also, with only one place to mount the existing APR, the user has no choice in how much desk space their notebook computer may take up or how much of the notebook/APR can be viewed or is accessible.

Currently, one available monitor stand has a sliding tray that users slide out and dock their notebook computers, with legs in the front for support. The APR can be attached to different locations on the tray.

Therefore, what is needed is a monitor stand which provides more access to the APR and the notebook computer.

SUMMARY

One embodiment, accordingly, provides a monitor stand having enhanced access to a portable information handling system and a docking system. To this end, the monitor stand includes a base, a support member attached to the base and a cantilevered support attached to the support member. The cantilevered support is substantially parallel to and spaced apart from the base.

A principal advantage of this embodiment is that there are no support members obstructing access to the front section and side sections of the monitor stand, thereby providing enhanced access to a docking system mounted on the base surface and the portable information handling system docked with the docking system.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
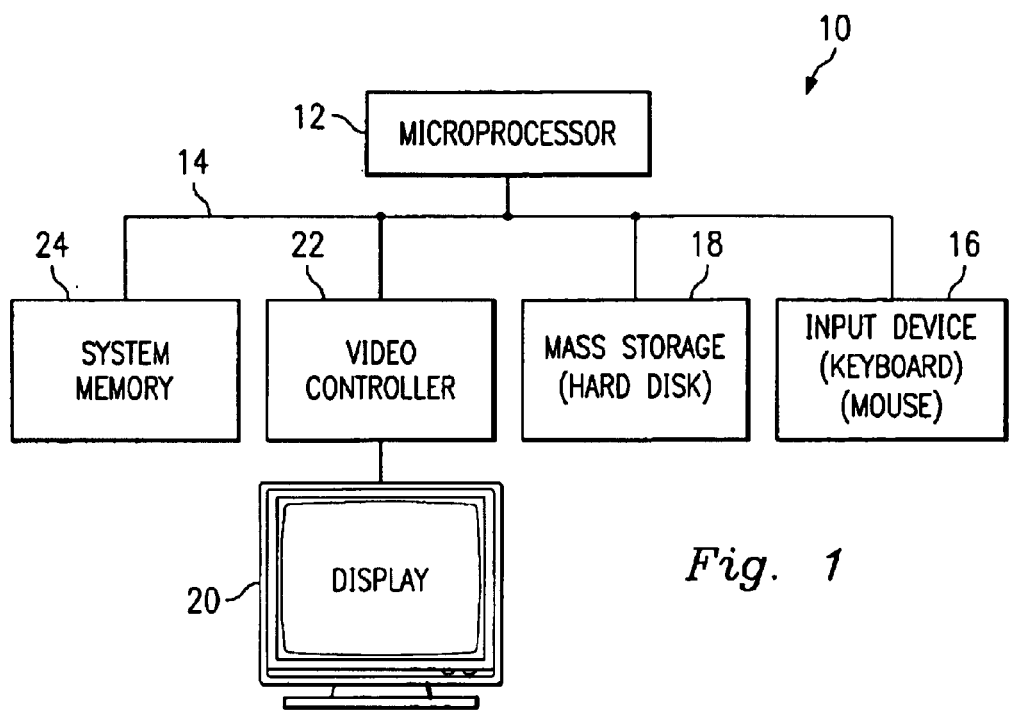
FIG. 1 is a diagrammatic view illustrating an embodiment of an information system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
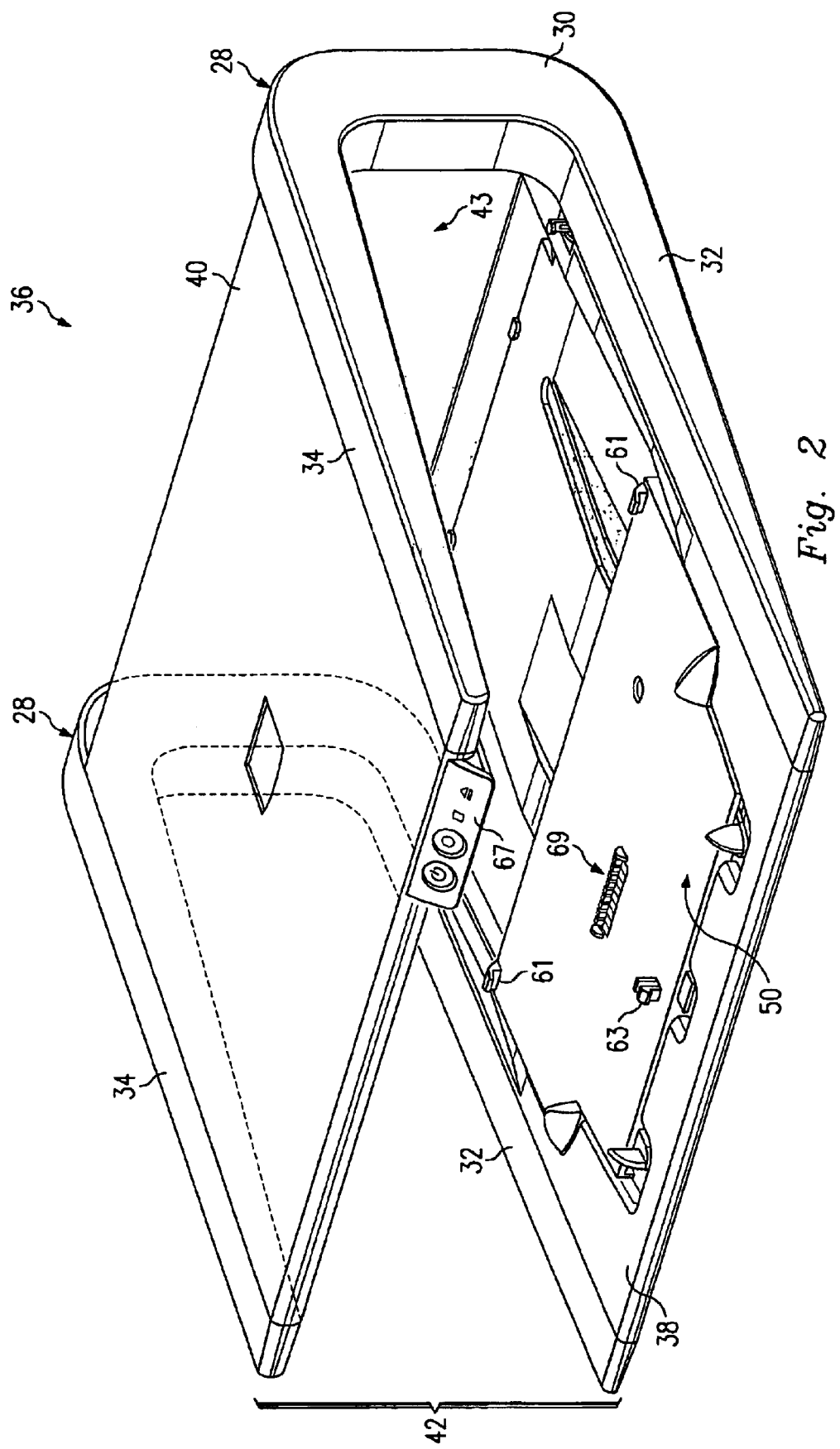
FIG. 2 is a perspective view illustrating an embodiment of a monitor stand.

A monitor stand 36, FIG. 2, includes a base surface 38, a pair of support members 28 which are attached to the base surface 38, and a cantilevered support surface 40 which is attached to the support members 28 and which extends substantially parallel to the base surface 38. Thus, the base surface 38 and the cantilevered support surface 40 are separated by a defined space indicated at 42.

Figure 3:
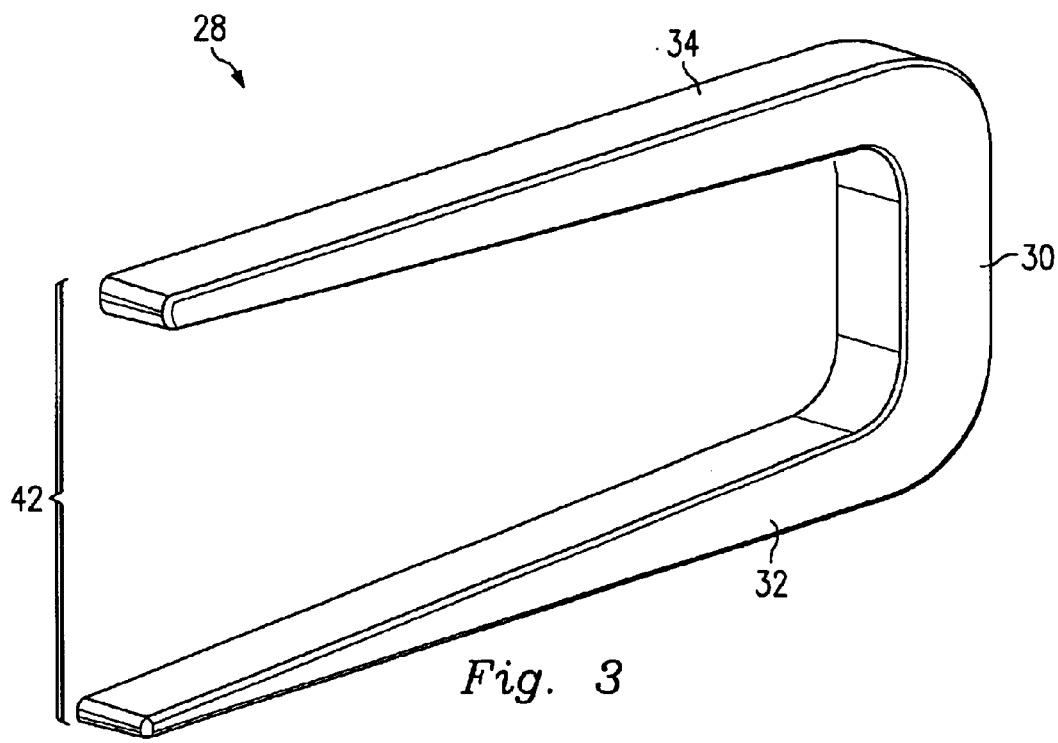
FIG. 3 is a perspective view illustrating a structural support member.

Support members 28, see FIG. 3, each include a U-shaped reinforcing member which comprises a first beam 32 and a second beam 34. The beams 32, 34 are interconnected by a support portion 30. The first beam 32 extends in a first direction along the base surface 38, the support portion 30 extends substantially orthogonal to first beam 32, and the second beam 34 is a cantilever beam which extends from the support portion 30 in the first direction. Thus, the beams 32, 34 are substantially parallel and are also separated by the space 42. An opening 43, FIG. 2, opposite the space 42, is defined between support portions 30, base surface 38 and support surface 40. As a result of fabricating the stand 36, one or more support members 28 may be used to attach to the base surface 38 and the support surface 40. It may also be desirable to form the stand 36 as a molded piece whereby one or more support members 28 are molded with the surfaces 38 and 40.

FIG. 2 also illustrates a tray member 50 movably mounted on the base surface 38. By referring to FIG. 4, it can be seen that base surface 38 includes a pair of spaced apart guides 52, and a pair of spaced apart side guides 54. The side guides 54 also each include a plurality of recesses 55 formed therein. In addition, tray position indicators 1–4 are embossed on surface 38 and relate to recesses 55. Thus, movement of tray member 50 is guided by the guides 52 and 54.

Figure 5:
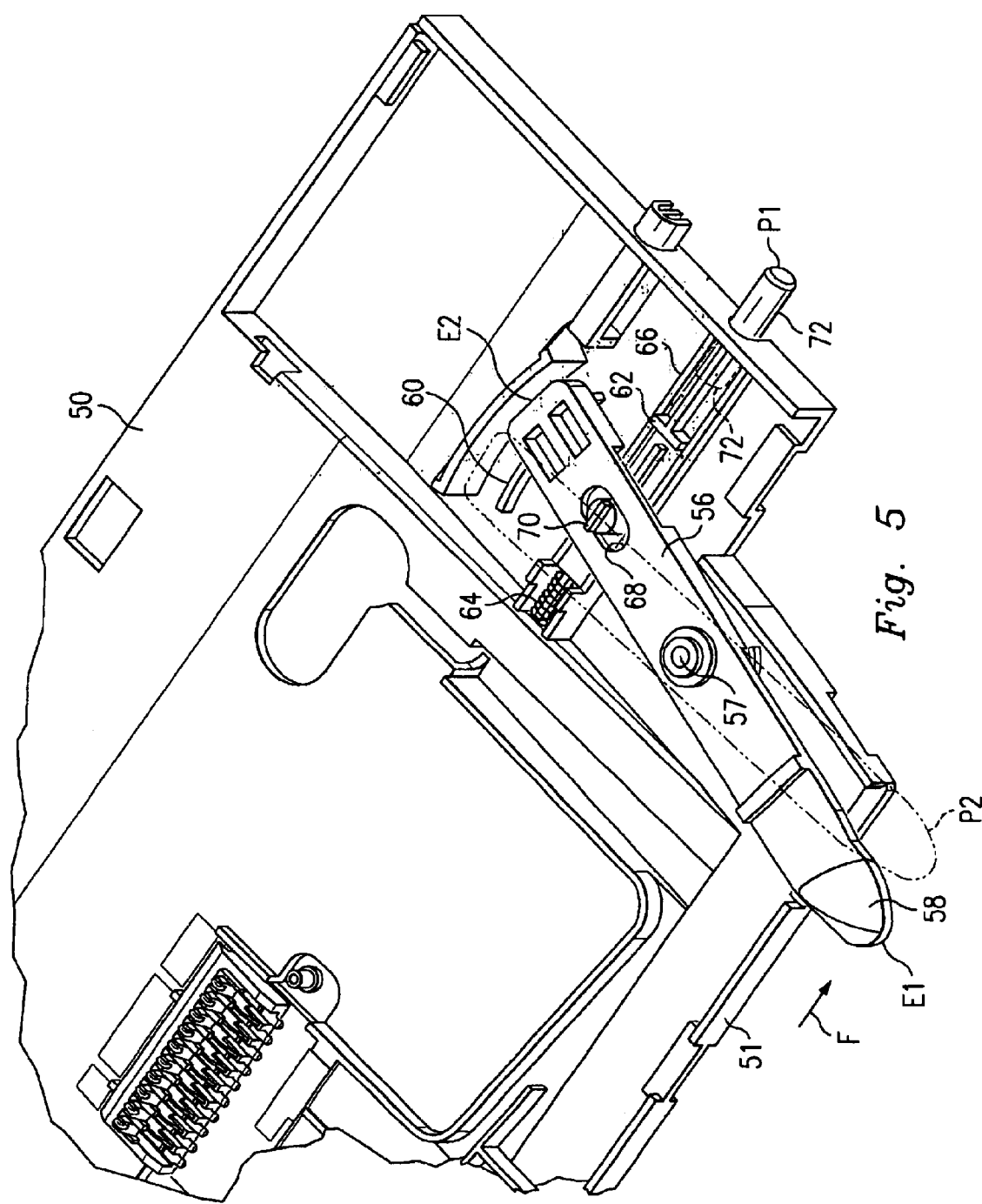
FIG. 5 is a perspective view illustrating an embodiment of a portion of the tray member.
Figure 6:
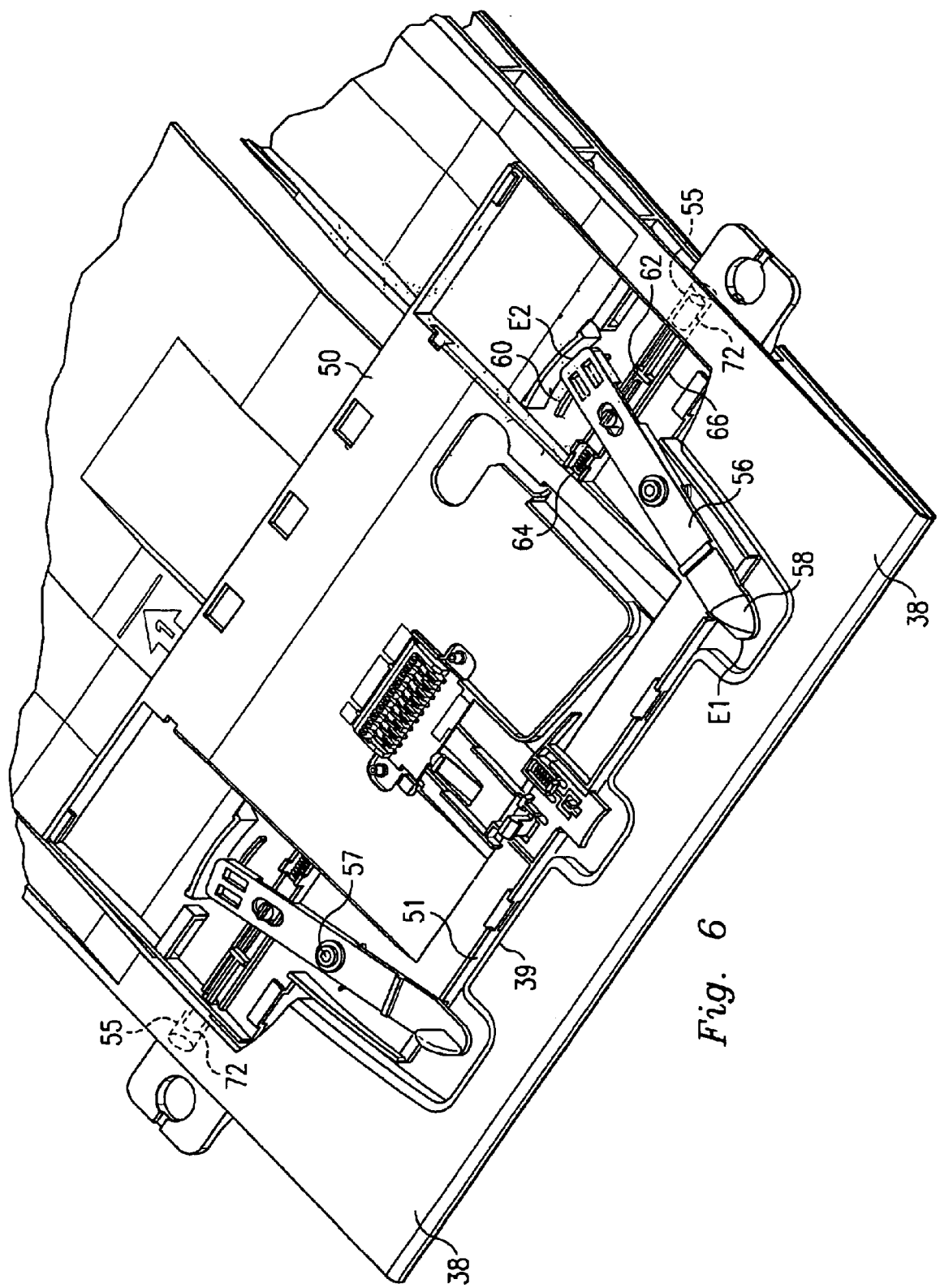
FIG. 6 is a perspective view illustrating an exposed embodiment of the tray member on the monitor stand.

The tray member 50, FIGS. 5 and 6 includes a pair of tray position latches 56 each pivotally mounted at a pivot point 57. A first end E1 of each latch 56 includes an actuator tab 58 and a second end E2 of each latch 56 rides in an arcuate slot 60. A plunger 62 is resiliently mounted with a spring 64 for reciprocal movement in a slot 66, and a cam slot 68 in latch 56 receives a cam 70 which extends from plunger 62. A lock end 72 of plunger 62 is urged by spring 64 to remain extended from tray member 50 in an at rest position P1, except when a force F is applied to actuator tab 58 sufficient to pivot latch 56 against spring 64 to a position P2 and retract lock end 72 into tray member 50.

Figure 4:
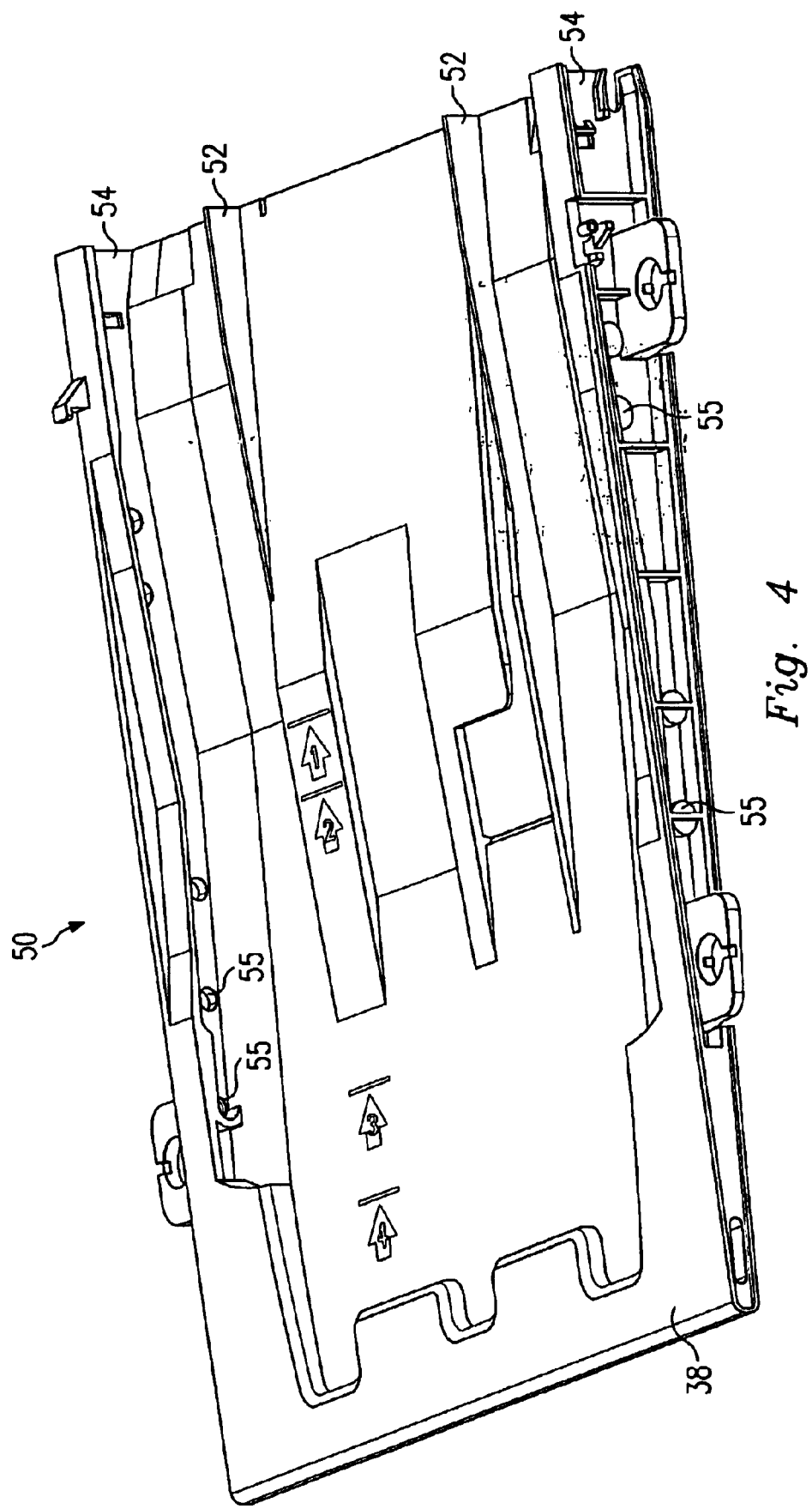
FIG. 4 is a perspective view illustrating an embodiment of a tray member on the monitor stand.

Thus it can be seen in FIGS. 4–6 that an edge portion 51 of tray member 50 is positionable at indicators 1–4 and also at a fifth position wherein edge portion 51 is immediately adjacent an edge 39 of base surface 38 (See FIG. 6). This is accomplished by positioning the indicators 1–4 to correspond with lock end 72 of plunger 62 being seated in a selected one of the recesses 55.

Figure 7:
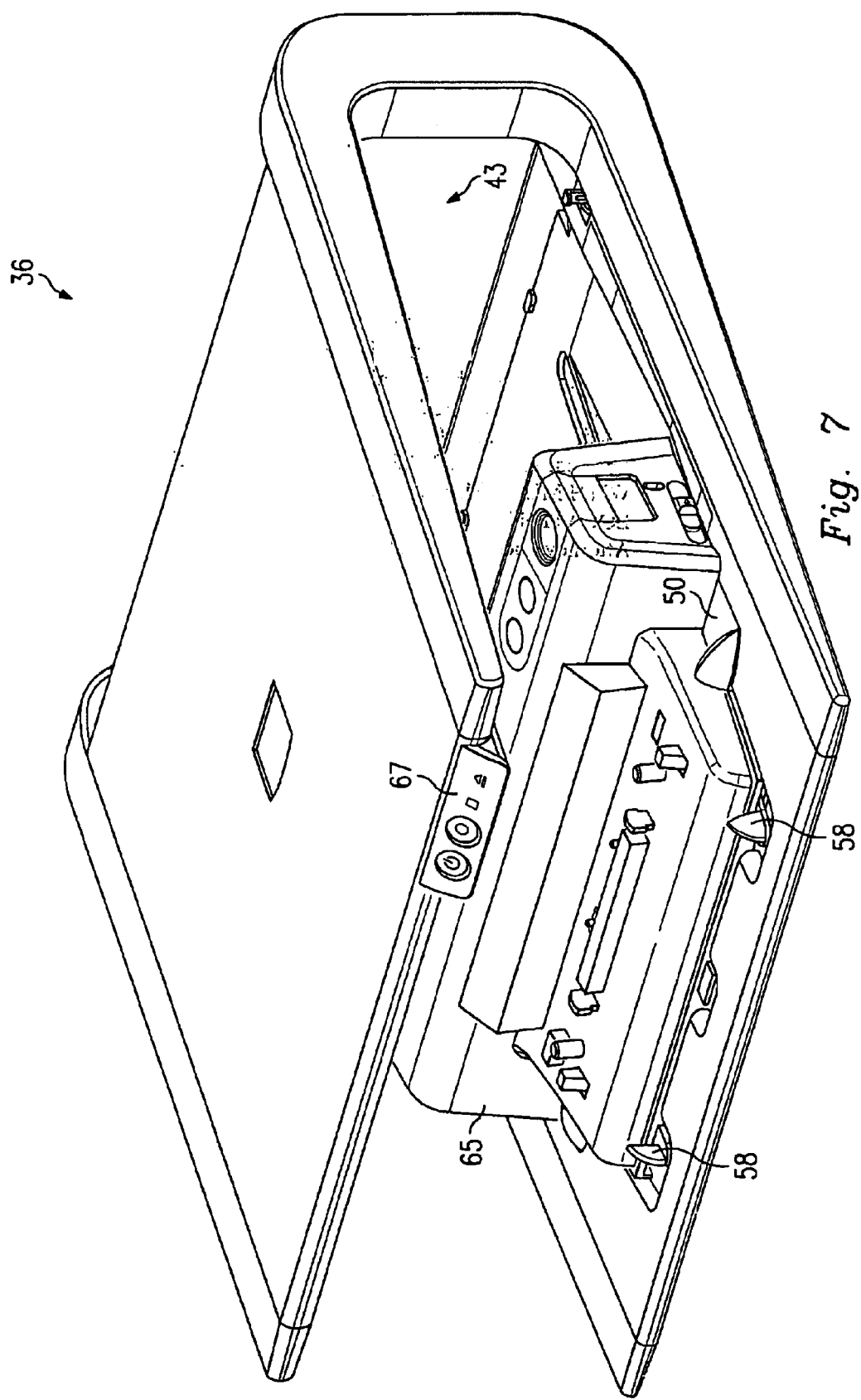
FIG. 7 is a perspective view illustrating an embodiment of the monitor stand with a docking system mounted on the base surface.
Figure 8:
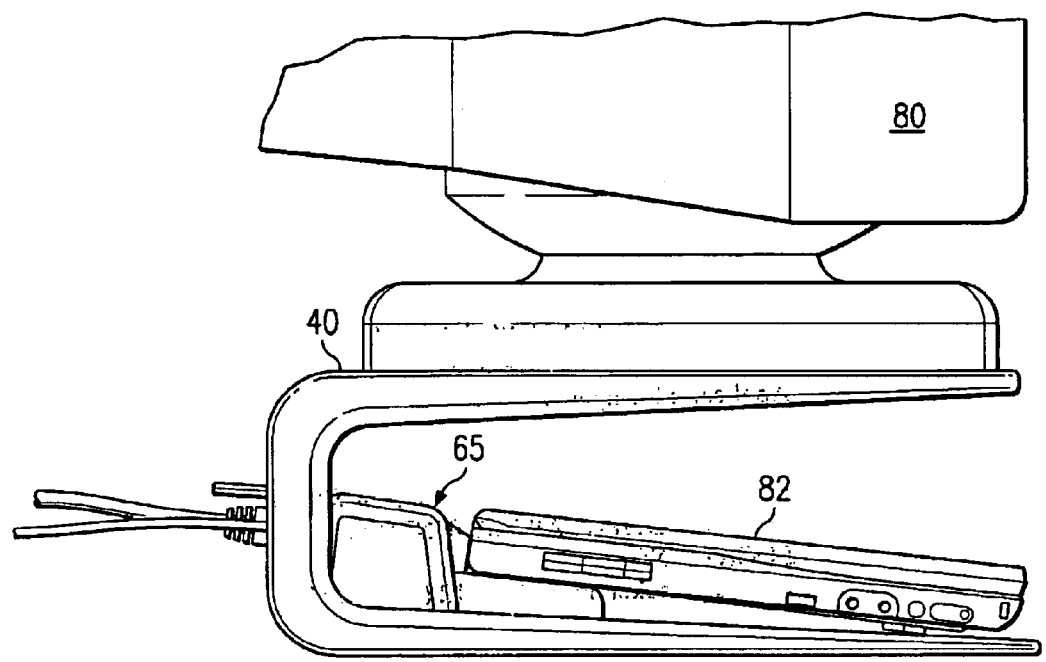
FIG. 8 is a side view illustrating an embodiment of the monitor stand with the docking system mounted on the base surface and a portable computer docked in the docking system in one position.
Figure 9:
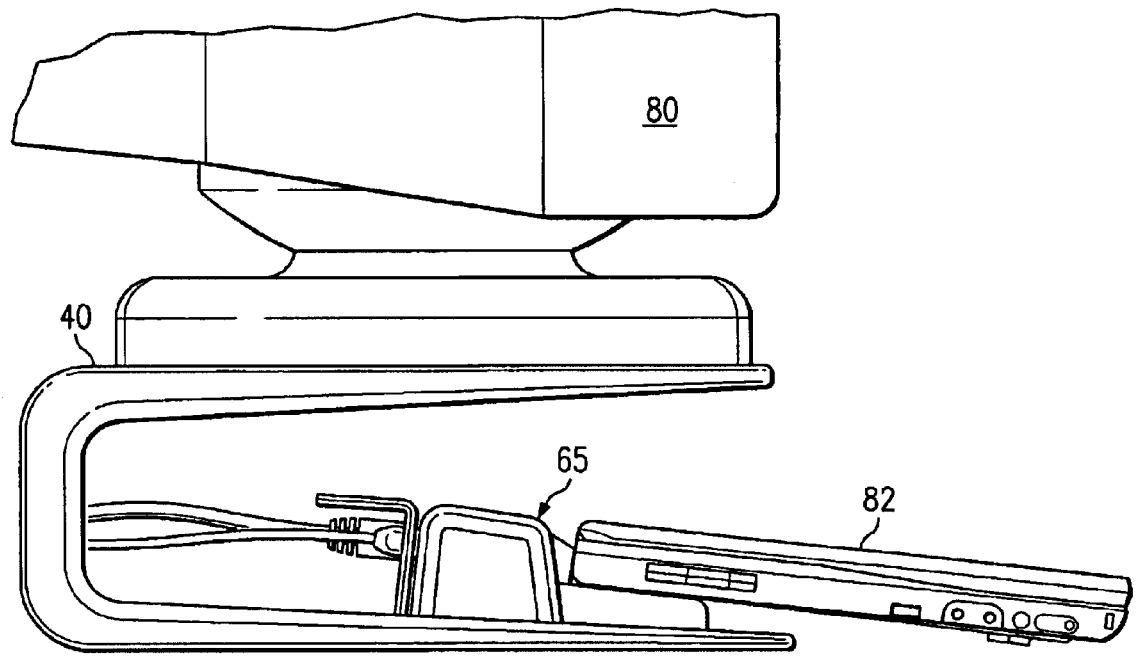
FIG. 9 is a side view illustrating an embodiment of the monitor stand with the portable computer docked with the docking system in another position.
Figure 10:
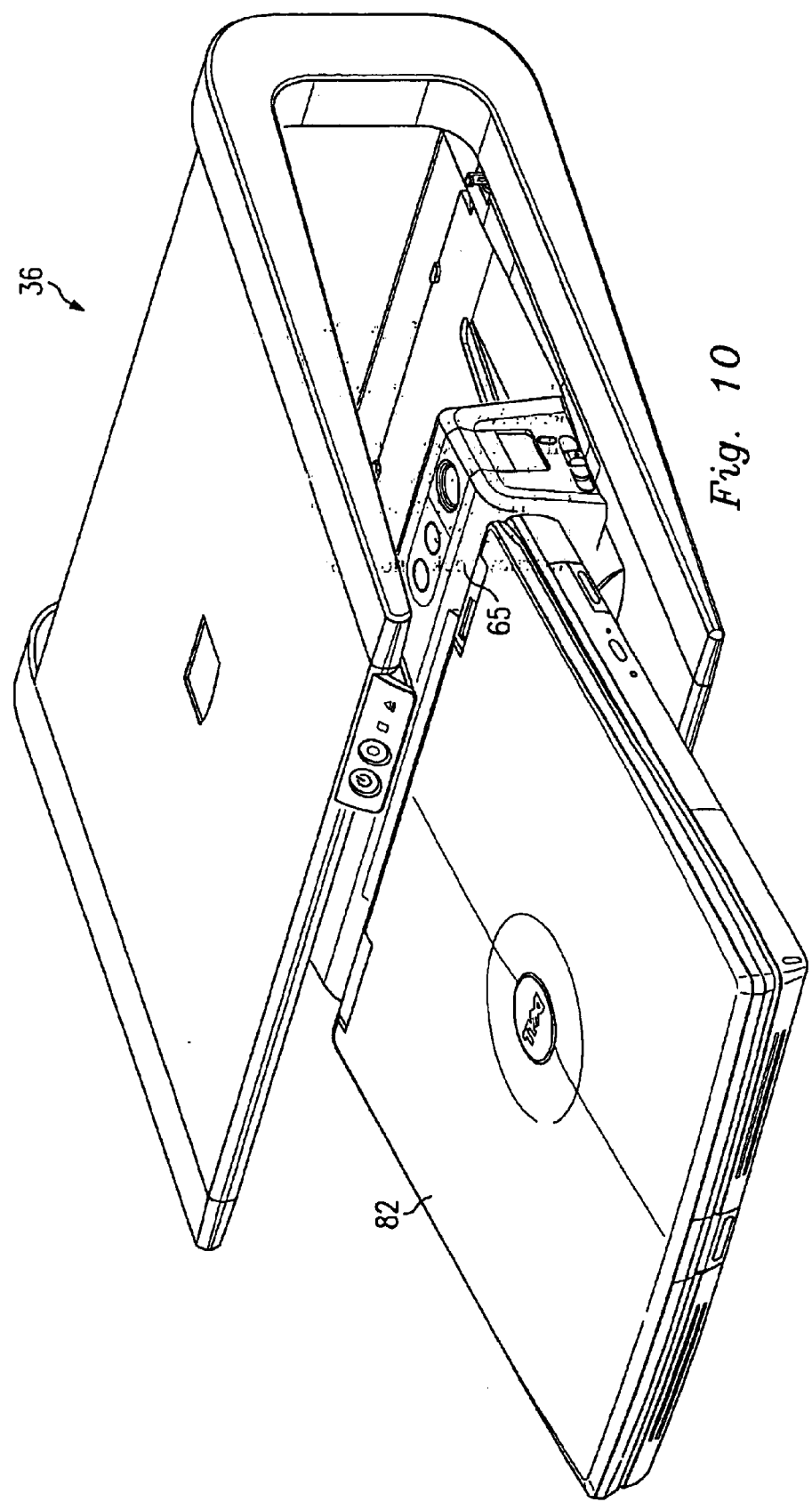
FIG. 10 is a perspective view illustrating an embodiment of the monitor stand with the portable computer docked with the docking system.

A docking system such as an APR 65, FIG. 7, is removably connected to tray member 50 by placing docking system 65 on retention tabs 61, see also FIG. 2, and securing docking system 65 with a securing means 63. When connected to tray member 50, docking system 65 is electronically connected to a plurality of monitor stand controls 67 through a monitor stand controls connection 69. A release tab 59, releases docking system 65 from securing means 63. A monitor 80, FIG. 8, is mounted on cantilever support surface 40. A portable computer 82 is docked on docking system 65 in one position, and in FIGS. 9 and 10, the portable computer 82 is docked in docking system 65 in another position. In this manner, a user has the option of locating the docked computer 82 in a variety of positions.

Figure 11:
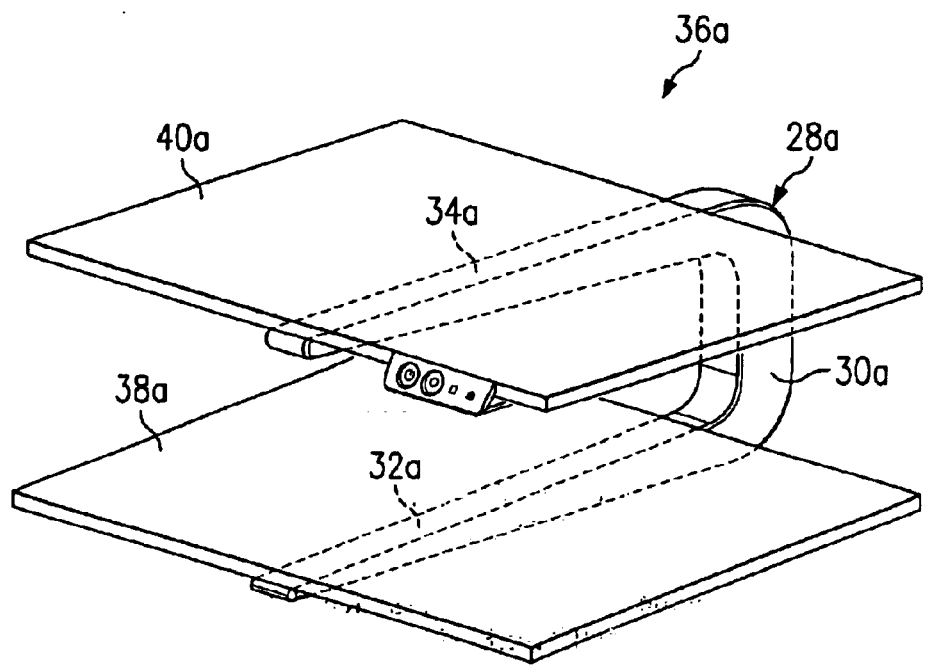
FIGS. 11 and 12 are perspective views illustrating alternate embodiments of the monitor stand.
Figure 12:
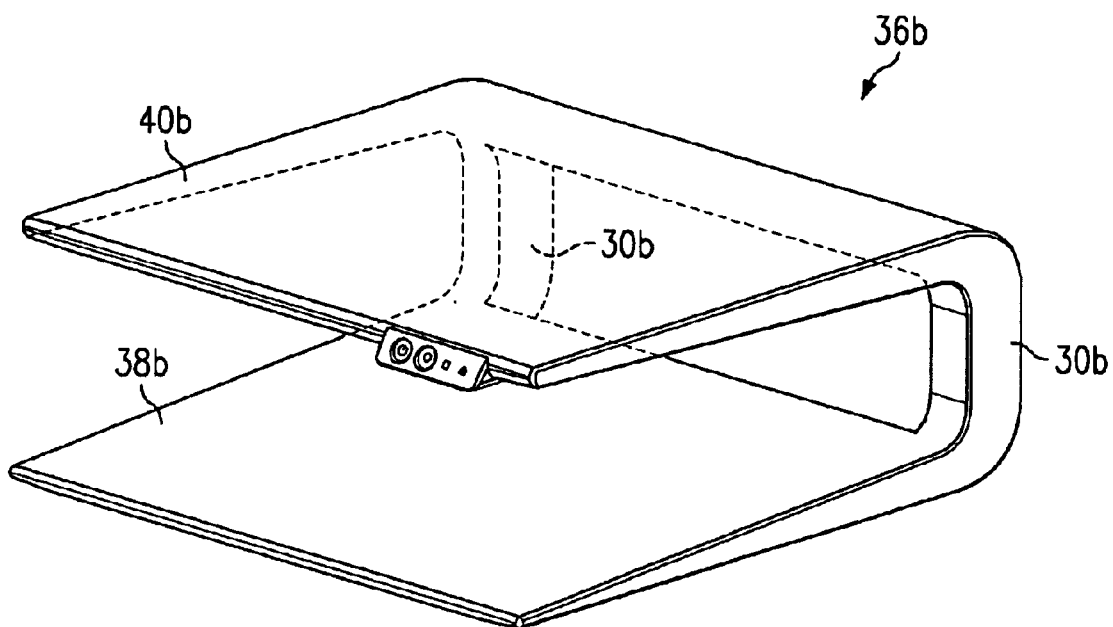

In FIG. 11, an alternative fabricated or molded monitor stand 36a includes a single support member 28a, including a support portion 30a, a first beam 32a and a second beam 34a, a base surface 38a and a cantilevered support surface 40a. In FIG. 12, another alternative molded stand 36b includes a base surface 38b and a cantilevered support surface 40b interconnected by support portions 30b.

Figure 13:
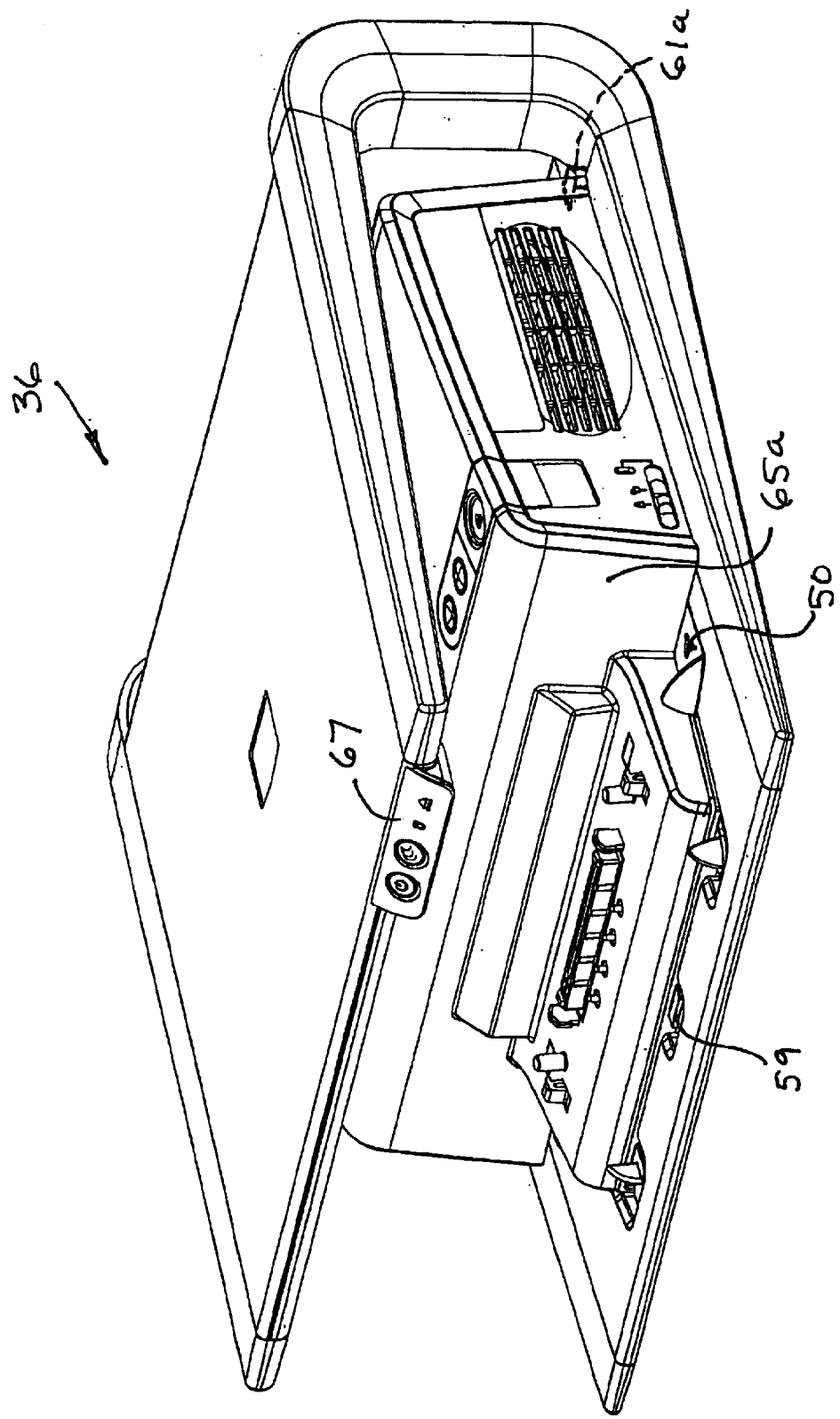
FIG. 13 is a perspective view illustrating an embodiment of the monitor stand with an alternative docking system mounted on the base surface.

An alternative docking system such as a docking station 65a, FIG. 13, is removably mounted to tray member 50 by placing docking system 65a on retention tabs 61a, FIG. 2, and securing docking system 65a with securing means 63. When connected to tray member 50, docking system 65a is electronically connected to controls 67 through connection 69. However, the docking system 65a, FIG. 13, being larger than the docking system 65, FIG. 7, is mounted on tray member 50 in a stationary position, rather than being movable to multiple positions such as when the relatively smaller docking system 65 is being used. Release of docking system 65a from tray member 50, FIG. 13, is accomplished by actuating release tab 59, as described above.

In operation, the present monitor stand is completely open at the front and sides, because there are no front legs. Such construction offers several advantages. This allows a user full access to the docking system and notebook. Within the stand, there is a sliding mechanism that the docking system mounts to, which allows the user to move an APR to five different locations. This will allow the user to choose how much access is available to the notebook and the APR. The user has the option to have the APR/notebook in sight or to completely hide the notebook and APR underneath the monitor stand, which can save desk space. There are three other locations in between these two terminal positions. A docking station can also be mounted on the sliding mechanism. However, when used with the docking station, the sliding mechanism remains stationary.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A monitor stand comprising:
   a continuous support member, the support member including a first beam, a second beam extending substantially parallel to the first beam and a support portion extending between and spacing apart the first and second beams such that an open spacing is defined at a terminal end of the first and second beams;

a base surface attached to the first beam; and a cantilevered support surface attached to the second beam, the cantilevered support surface being substantially parallel to and spaced apart from the base surface.

2. The monitor stand of claim 1, wherein the continuous support member is substantially U-shaped.

3. The monitor stand of claim 1, further comprising a plurality of U-shaped continuous support members.

4. The monitor stand of claim 1, further comprising a positioning member mounted on the base surface for selectively attaching one of a docking station and an APR.

5. The monitor stand of claim 4, wherein the positioning member is adjustably connected to the base surface.

6. A monitor stand comprising:

a continuous support member, the support member including a first beam extending in a first direction, a second beam extending in the first direction and a support portion extending between and spacing apart the first and second beams such that an open spacing is defined at a terminal end of the first and second beams;

a base surface attached to the first beam; and a cantilevered support surface attached to the second beam, the cantilevered support surface being substantially parallel to and spaced apart from the base surface.

7. The monitor stand of claim 6, wherein the continuous support member is substantially U-shaped.

8. The monitor stand of claim 6, further comprising a plurality of U-shaped continuous support members.

9. The monitor stand of claim 6, further comprising a positioning member mounted on the base surface for selectively attaching one of a docking station and an APR.

10. The monitor stand of claim 9, wherein the positioning member is adjustably connected to the base.

11. A monitor stand comprising:

a continuous support member, the support member including a first beam extending in a first direction, a second beam extending in the first direction and a support portion extending between and spacing apart the first and second beams such that an open spacing is defined at a terminal end of the first and second beams;

a base surface attached to the first beam;

a cantilevered support surface attached to the second beam, the cantilevered support surface being substantially parallel to and spaced apart from the base surface; and a positioning member mounted on the base surface and adjustable to various positions on the base surface.

12. The monitor stand of claim 11, wherein the continuous support member is substantially U-shaped.

13. The monitor stand of claim 11, further comprising a plurality of U-shaped continuous support members.

14. The monitor stand of claim 13 further comprising a docking system attached to the positioning member.

15. The monitor stand of claim 14 further comprising a portable computer docked with the docking system.

16. The monitor stand of claim 15, further comprising a connector on the positioning member.

17. The monitor stand of claim 15, further comprising a plurality of controls for connection to the docking system through the connector.

18. An information handling system comprising:

a continuous support member, the support member including a first beam, a second beam extending substantially parallel to the first beam and a support portion extending between and spacing apart the first and second beams such that an open spacing is defined at a terminal end of the first and second beams;

a base surface attached to the first beam;

a cantilevered support surface attached to the second beam, the cantilevered support surface being substantially parallel to and spaced apart from the base surface;

a positioning member movably mounted on the base surface;

a docking system removably mounted on the positioning member;

a computer docked with the dockingsystem, the computer including:

a chassis;

a microprocessor mounted in the chassis; and a storage coupled to the microprocessor.

* * * * *